United States Patent [19]

Su

[11] Patent Number: 5,297,324

[45] Date of Patent: Mar. 29, 1994

[54] FULLY ROUNDED JINGLE BELL MAKING METHOD

[76] Inventor: Wen-Chian Su, No. 247, Lin Sen Road, Chang Hua City, Taiwan

[21] Appl. No.: 91,431

[22] Filed: Jul. 15, 1993

[51] Int. Cl.$^5$ ............................................. B29D 17/00
[52] U.S. Cl. ................................................... 29/169.5
[58] Field of Search ...................... 29/169.5; 72/379.2; 116/170; 428/11

[56] References Cited

U.S. PATENT DOCUMENTS

| | | | |
|---|---|---|---|
| 183,605 | 10/1876 | Tucker | 116/170 |
| 203,675 | 5/1878 | Tucker | 29/169.5 |
| 1,266,485 | 5/1918 | Kingston | 72/379.2 |
| 2,568,190 | 9/1951 | Frankel | 29/169.5 |

Primary Examiner—P. W. Echols
Attorney, Agent, or Firm—Bacon & Thomas

[57] ABSTRACT

A fully rounded jingle bell making method including steps of (a) preparing a bell blank having four blades spaced by notches around a dome-like body portion; (b) secondarily punching the bell blank to turn the blades from respective horizontal positions to vertical positions; (c) preparing a mold consisted of a rotary lower die, and an upper die having a cross piece projected on the inside; (d) placing the secondarily shape formed bell blank in the lower die to carry a steel ball; (e) punching the upper die against the lower die to deform the four blades of the bell blank, causing the blades to fit over the inside wall of the upper die and to cover around the steel ball; (f) removing the finished, fully rounded jingle bell from the upper die by inserting push rods into guide holes on the upper die.

3 Claims, 3 Drawing Sheets

FULLY ROUNDED JINGLE BELL MAKING METHOD

BACKGROUND OF THE INVENTION

The present invention relates to a jingle bell making method, and more particularly to a method of making a jingle bell having a unitary, hollow, spherical casing with a cross mouth.

Various jingle bells have been disclosed, and have appeared on the market. FIG. 1 illustrates a jingle bell according to the prior art, which comprises an upper part B having a hanger, a lower part A having a mouth, and an outward flange C between the upper part B and the lower part A. This structure of jingle bell is formed by punching two separate parts, namely, the upper part B and the lower part A together, and the connection between the upper part B and the lower part A forms into the outward flange C. Therefore, this structure of jingle bell does not have a smooth outside surface. If the upper and lower parts are fastened together through a welding process in order to obtain a smooth outside surface, the manufacturing cost of the jingle bell with be greatly increased. FIG. 2 illustrates another structure of jingle bell according to the prior art, which is formed by punching a bell blank in a mold consisted of an upper die having a half-round bottom cavity and a lower die having a half-round top cavity. While punching in the mold, the blades D of the bell blank may be tilted sideways and unequally spaced from one another. Because the upper die has no means to stop the tip of each blade during punching, the end of the casing of the jingle bell thus formed is made in a flat configuration. Therefore, it is not possible to obtain a fully rounded casing for a jingle bell according to conventional jingle bell making methods.

SUMMARY OF THE INVENTION

The present invention has been accomplished under the aforesaid circumstances. It is therefore the principal object of the present invention to provide a method for making a jingle bell having an integral, hollow spherical casing.

According to the present invention, the jingle bell making method comprises steps of preparing a bell blank having four blades spaced by notches around a dome-like body portion; secondarily punching the bell blank in a tubular mold to turn the blades from respective horizontal positions to vertical positions; preparing a mold consisted of a rotary lower die, and an upper die having a cross piece projected on the inside; placing the secondarily shape formed bell blank in the lower die to carry a steel ball; inserting the cross piece of the upper die in between the blades of the bell blank and then punching the upper die against the lower die to deform the four blades of the bell blank, causing the blades to fit over the inside wall of the upper die and to cover around the steel ball; removing the finished, fully rounded jingle bell from the upper die by inserting push rods into guide holes on the upper die. The cross piece is detachably fastened in a cross through hole on the upper die, and therefore it can be easily replaced when deformed or damaged. The bottom of the cross piece curves inwards, and therefore the finished jingle bell can be easily removed from the upper die by the push rods.

DETAILED DESCRIPTION OF THE PREFERRED EMBODIMENT

Figure 1:
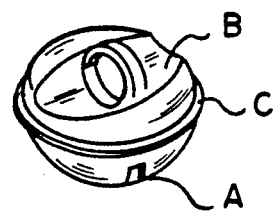
FIG. 1 is a perspective view of a prior art jingle bell made by punching two parts together.
Figure 2:
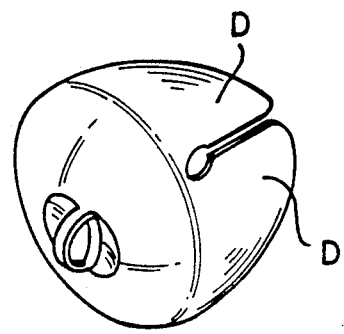
FIG. 2 is a perspective view of another prior art jingle bell shape formed by punching an upper die against a lower die.
Figure 3:
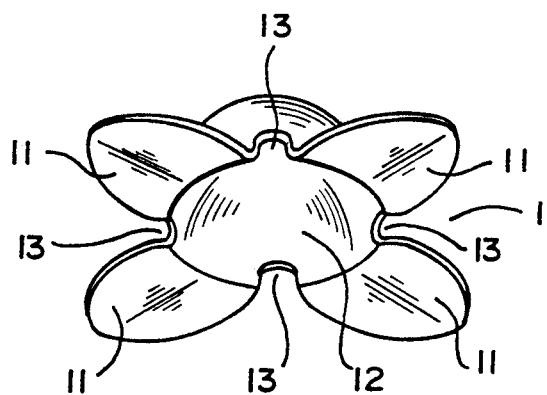
FIG. 3 is a perspective view of a primarily shape formed bell blank according to the present invention.
Figure 4:
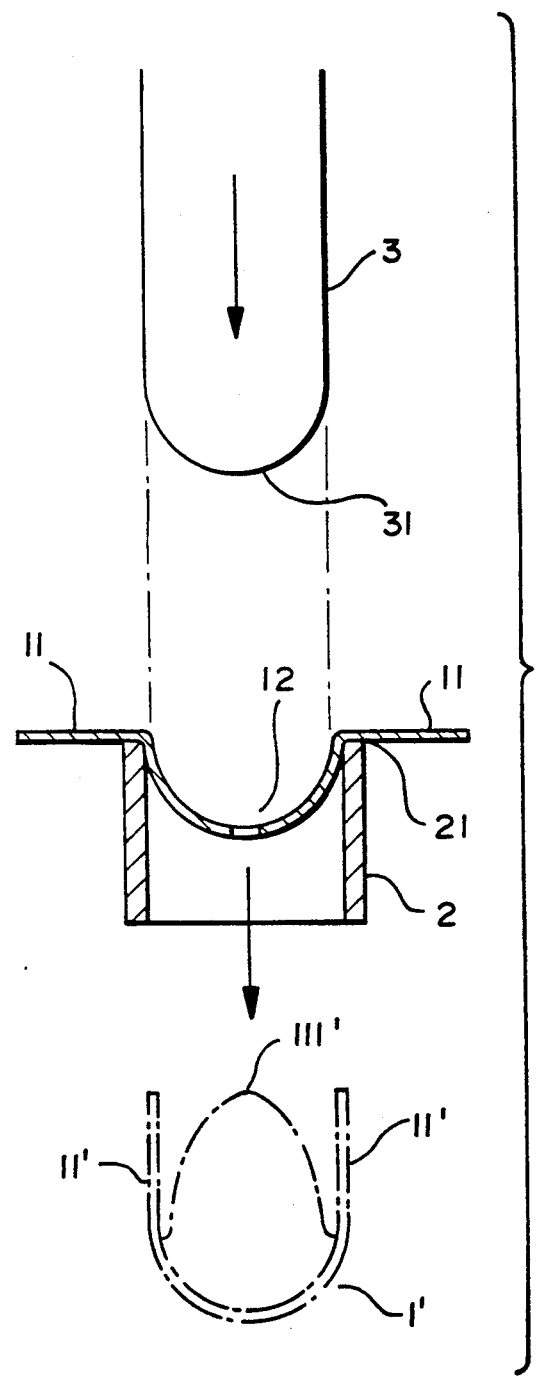
FIG. 4 illustrates the bell blank secondarily shape formed according to the present invention.
Figure 5:
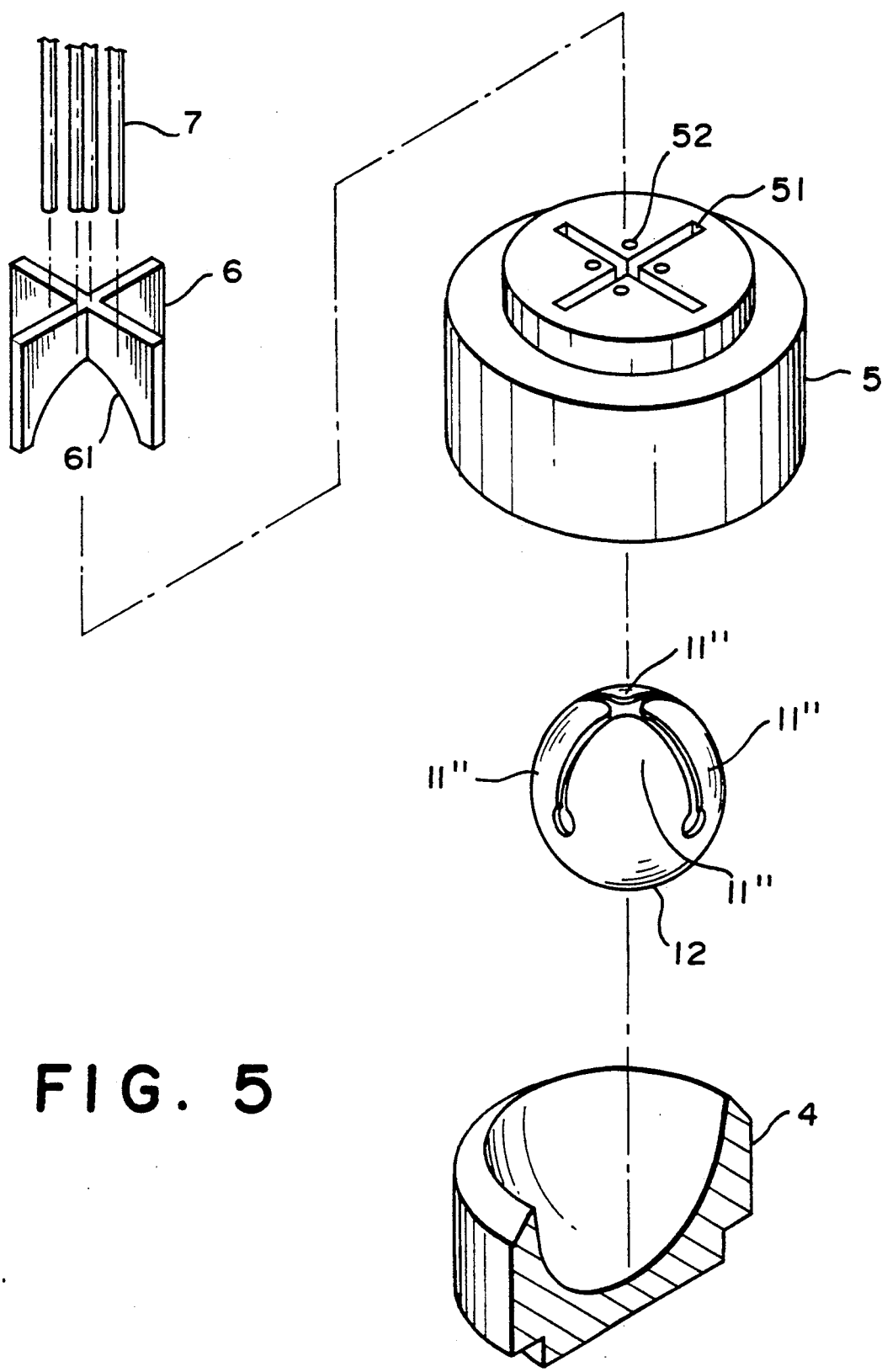
FIG. 5 is a perspective exploded view of the upper and lower dies and the finished, fully rounded jingle bell according to the present invention.
Figure 6:
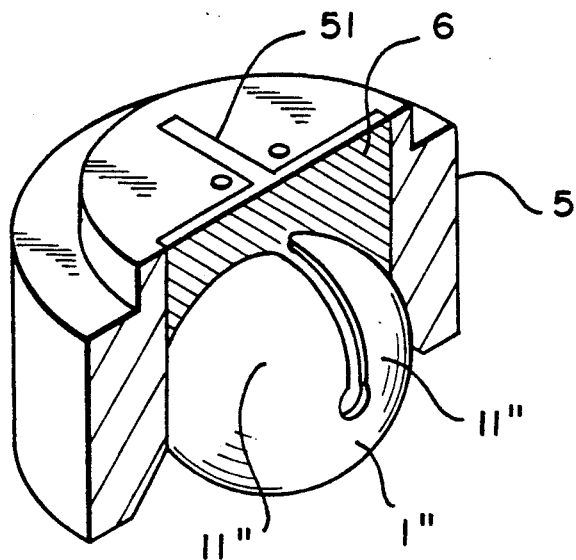
FIG. 6 is a cut away view of the upper die showing the secondarily shape formed bell blank disposed within the cavity of the upper die according to the present invention.
Figure 8:
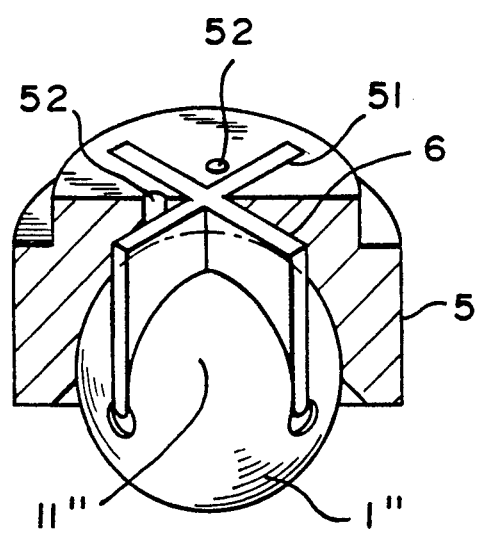
FIG. 8 is another cut away view of the upper die showing blades stopped against the cross piece and deformed to fit over the inside wall of the cavity of the upper die according to the present invention.
Figure 7:
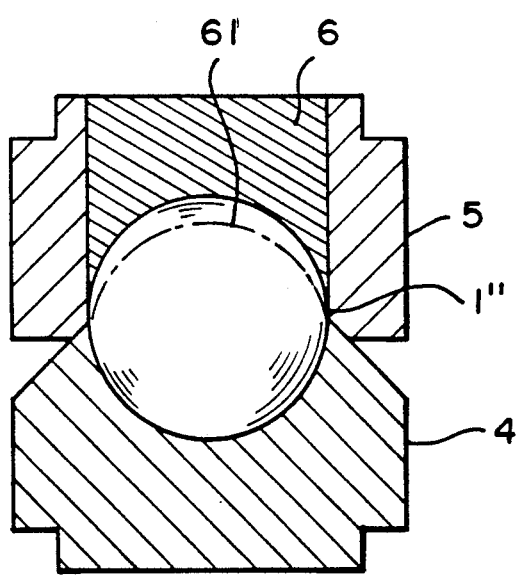
FIG. 7 is a cross sectional view showing the upper die punched against the lower die.

Referring to FIGS. 3 and 4, a metal plate is primarily punched into a bell blank 1 having four blades 11 equiangularly and horizontally extended outwards from a dome-like body portion 12 and spaced from one another by notches 13 on the periphery of the dome-like body portion 12. The dome-like body portion 12 of the bell blank 1 is inverted placed on a tubular mold 2 of inner diameter equal to the outer diameter of the dome-like body portion 12 for permitting the four blades 11 to bridge over the top orifice 21 of the tubular mold 2. A punch rod 3 having a half-round punching tip 31 of diameter equal to the inner diameter of the dome-like body portion 12 is driven to punch the dome-like body portion 12 secondarily, causing the four blades 11 to be moved into the tubular mold 2 along its inside wall. Thus, a secondarily shape formed bell blank 1' (see the dotted line in FIG. 4) is obtained having four blades 11' respectively disposed in vertical.

Referring to FIGS. 5, 6, 7, and 8, the outside wall of the dome-like body portion 12 of the secondarily shape formed bell blank 1' is placed in the half-round cavity of a rotary lower die 4, then a steel ball (not shown) is placed on the dome-like body portion 12 of the secondarily shape formed bell blank 1', and then a correspondent upper die 5 is placed on the rotary lower die 4 over the bell blank 1', and then the upper die 5 is punched against the lower die 4. The upper die 5 comprises a cross piece 6 detachably fastened in a cross through hole 51 thereof and projected into the half-round cavity thereof. Because the cross piece 6 is detachably fastened to the upper die 5, it can be easily replaced when damaged or deformed. When assembled, the cross piece 6 is disposed between the four blades 11', and therefore the lower die 4 is moved to align with the upper die 5. During punching, the four blades 11" are forced by the cross piece 6 to fit over the inside wall of the half-round cavity of the upper die 5 (because the tip 111' of each blade is stopped against the cross piece 6 at either side. After punching, a fully rounded jingle bell 1" having a cross mouth is obtained.

Referring to FIGS. 5 and 8 again, the upper die 5 has four guide holes 52 equiangularly spaced around the center by the cross through holes 51, through which push rods 7 are respectively inserted to push the fully rounded jingle bell 1" out of the mold. Further, the bottom 61 of the cross piece 6 curves inwards. This design allows the finished, fully rounded jingle bell 1" to be easily removed from the mold.

What is claimed is:

1. A fully rounded jingle bell making method comprising steps of:
   (a) preparing a bell blank primarily shaped formed from a metal plate by a punching process, the bell blank having four blades equiangularly and horizontally extended outwards from a dome-like body portion thereof and spaced from one another by notches on the border of said dome-like body portion;
   (b) placing the bell blank in a tubular mold for allowing the four blades of the bell blank to bridge over the cavity of the tubular mold, and then punching the primarily shape formed bell blank into a secondarily shaped formed bell blank having the four blades turned from respective horizontal positions to respective vertical positions;
   (c) preparing a mold comprising a rotary lower die having a half-round top cavity and an upper die having a half-round bottom cavity, a cross-shaped hole extending through the upper die and into the half-round bottom cavity, a cross-piece detachably receivable within the cross-shaped hole, and a plurality of guide holes equiangularly spaced around a center of the upper die for receiving a plurality of push rods;
   (d) placing the outside wall of the secondarily shape formed bell blank thus obtained from the step (b) in the half-round top cavity of said rotary lower die, then placing a steel ball on the secondarily shape formed bell blank, and then placing said upper die on said lower die for permitting said cross piece to insert between the four blades of said secondarily shape formed bell blank;
   (e) punching said upper die against said lower die to deform the four blades of said secondarily shape formed bell blank, causing the four blades of said secondarily shape formed bell blank to fit over the surface of the bottom cavity of said upper die and to form with said steel ball into a finished, fully rounded jingle bell having a cross mouth;
   (f) removing the finished, fully rounded jingle bell from said upper die by inserting push rods into said guide holes on said upper die.

2. The method of claim 1 wherein said cross piece has a bottom surface curved inwards to facilitate the stripping of the finished, fully rounded jingle bell from said upper die.

3. The method of claim 1 wherein said cross piece is detachably fastened in a cross through hole on said upper die.

* * * * *